(12) United States Patent
Jang et al.

(10) Patent No.: US 9,295,019 B2
(45) Date of Patent: Mar. 22, 2016

(54) METHOD FOR PERFORMING DEVICE-TO-DEVICE COMMUNICATION IN WIRELESS ACCESS SYSTEM AND APPARATUS FOR SAME

(71) Applicant: LG ELECTRONICS INC., Seoul (KR)

(72) Inventors: Jiwoong Jang, Anyang-si (KR); Dongcheol Kim, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 131 days.

(21) Appl. No.: 14/356,355

(22) PCT Filed: Nov. 26, 2012

(86) PCT No.: PCT/KR2012/010015
§ 371 (c)(1),
(2) Date: May 5, 2014

(87) PCT Pub. No.: WO2013/077684
PCT Pub. Date: May 30, 2013

(65) Prior Publication Data
US 2014/0286293 A1    Sep. 25, 2014

Related U.S. Application Data

(60) Provisional application No. 61/563,551, filed on Nov. 24, 2011.

(51) Int. Cl.
*H04W 4/00* (2009.01)
*H04W 56/00* (2009.01)
(Continued)

(52) U.S. Cl.
CPC ........... *H04W 56/002* (2013.01); *H04L 5/0044* (2013.01); *H04L 5/0051* (2013.01); *H04W 72/04* (2013.01); *H04W 76/023* (2013.01)

(58) Field of Classification Search
CPC ............. H04W 56/002; H04W 76/023; H04L 5/0044; H04L 5/0051
See application file for complete search history.

(56) References Cited

U.S. PATENT DOCUMENTS 5,995,844 A     11/1999  Fukuda
2007/0153758 A1  7/2007  Kang et al.
(Continued)

FOREIGN PATENT DOCUMENTS

KR    10-2009-0062435 A    6/2009
WO       2011-036507 A1    3/2011

*Primary Examiner* — Robert Wilson
(74) *Attorney, Agent, or Firm* — Dentons US LLP

(57) ABSTRACT

The present invention discloses a method for performing device-to-device communication in a wireless access system supporting the device-to-device communication, and an apparatus for same. More specifically, the method comprises the steps of: a first device receiving from a base station resource allocation information for device-to-device communication with a second device; the first device transmitting to the second device an initial signal for device-to-device communication through a resource that is allocated; the first device scanning a response signal which is transmitted from the second terminal; and the first device performing the device-to-device communication with the second device when the first device receives the response signal from the second device, wherein the initial signal comprises a first reference signal for matching synchronization between the first and second devices, and a second reference signal for estimating a channel between the first device and the second device.

15 Claims, 11 Drawing Sheets

(51) Int. Cl.
*H04W 72/04* (2009.01)
*H04W 76/02* (2009.01)
*H04L 5/00* (2006.01)

(56) References Cited

U.S. PATENT DOCUMENTS

| | | | |
|---|---|---|---|
| 2011/0182280 A1* | 7/2011 | Charbit | H04W 56/0045 370/350 |
| 2014/0003262 A1* | 1/2014 | He | H04W 28/08 370/252 |
| 2014/0286293 A1* | 9/2014 | Jang | H04L 5/0044 370/329 |
| 2014/0321452 A1* | 10/2014 | Choi | H04W 8/005 370/350 |
| 2014/0324974 A1* | 10/2014 | Park | H04W 72/02 709/204 |
| 2015/0009949 A1* | 1/2015 | Khoryaev | H04W 48/16 370/330 |
| 2015/0119055 A1* | 4/2015 | Shin | H04W 48/12 455/450 |
| 2015/0271771 A1* | 9/2015 | Park | H04W 56/0015 370/350 |

* cited by examiner

FIG. 6
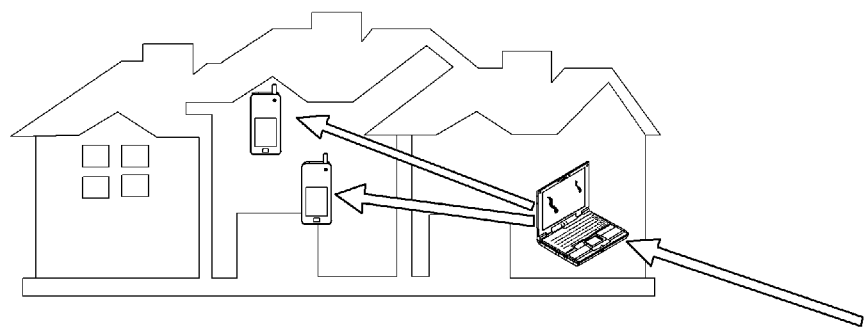
(a)
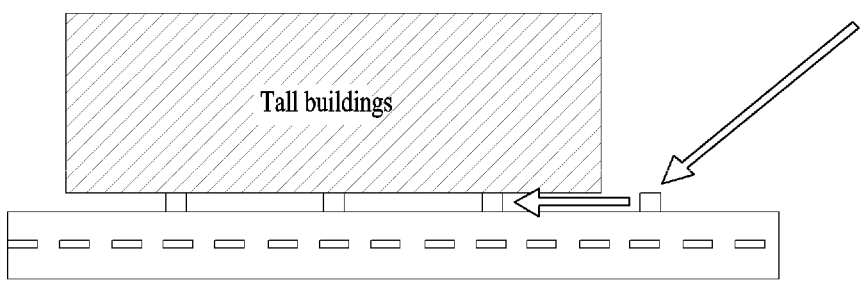
(b)

FIG. 7
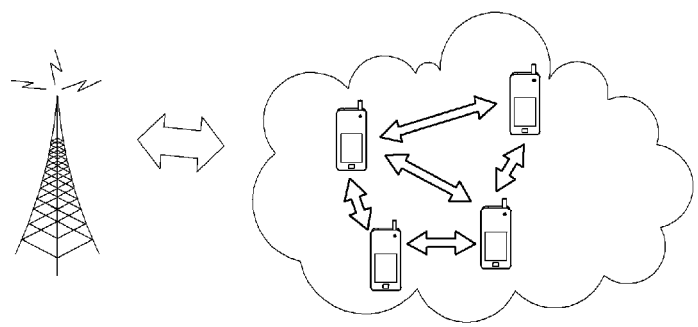
(a)
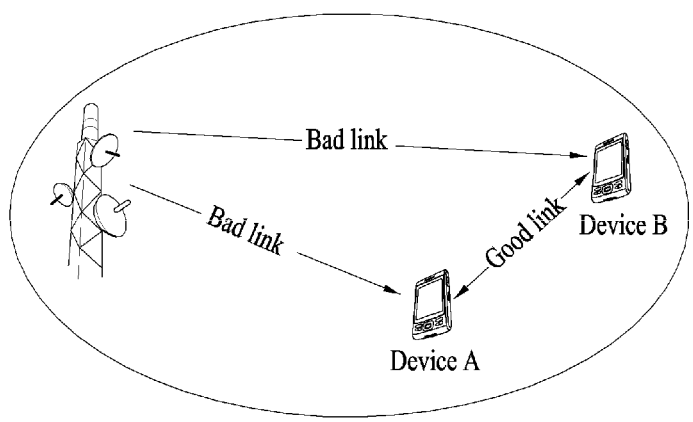
(b)

METHOD FOR PERFORMING DEVICE-TO-DEVICE COMMUNICATION IN WIRELESS ACCESS SYSTEM AND APPARATUS FOR SAME

This application is a National Stage entry of International Application No. PCT/KR2012/010015 filed Nov. 26, 2012, which claims priority to U.S. Provisional Application No. 61/563,551 filed Nov. 24, 2011, both of which are incorporated herein by reference.

TECHNICAL FIELD

The present invention relates to a wireless access system, and more particularly, to a method of performing a device-to-device (D2D) communication in a wireless access system supportive of the device-to-device (D2D) communication and apparatus therefor.

BACKGROUND ART

In a cellular communication, a user equipment existing in a cell accesses a base station to perform communication, receives control information for exchanging data from a base station, and then transceives data with the base station. In particular, since the user equipment transceives data through the base station, in order to transmit data to another cellular user equipment, the user equipment transmits its data to the base station. Having received the data, the base station transmits the received data to another user equipment. Thus, since data can be transmitted through the base station in order for one user equipment to transmit data to another user equipment, the base station performs scheduling of channels and resources for the data transceiving and also transmits channel and resource scheduling information to each user equipment. Thus, in order to perform a device-to-device (hereinafter abbreviated D2D) communication through the base station, each user equipment needs channel and resource allocations to transceive data with the base station. Yet, according to the structure of the D2D communication, one user equipment directly transceives signals with another user equipment, to which data shall be transmitted, without using a base station or a relay node.

If a D2D communication for transceiving data in direct between user equipments is performed in a manner of sharing resources with an existing cellular network mentioned in the above description, each user equipment proceeds to the D2D communication after completion of resource allocation for the D2D communication. However, a method of transmitting an initial signal for initiating a D2D communication has not been defined yet. Moreover, if a D2D communication for transceiving data in direct between user equipments is performed in a manner of sharing resources with an existing cellular network mentioned in the above description, it may cause a problem, to a user equipment currently performing the D2D communication, that synchronization with a user equipment currently performing a D2D communication with the cellular network is mismatched or a problem that synchronization between user equipments currently performing D2D communications with different user equipments is mismatched.

DISCLOSURE OF THE INVENTION

Technical Tasks

One object of the present invention is to provide a method of smoothly transceiving data between user equipments in a wireless access system, and preferably, in a D2D communication supportive wireless access system and apparatus therefor.

Another object of the present invention is to provide a method of transmitting an initial signal in a D2D communication and apparatus therefor.

A further object of the present invention is to provide a method of solving a problem caused by mobility and synchronization mismatch of a user equipment and apparatus therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of performing a D2D (device-to-device) communication in a wireless access system supportive of the D2D communication according to one embodiment of the present invention includes the steps of receiving by a first user equipment a resource allocation information for the D2D communication with a second user equipment from a base station, transmitting by the first user equipment an initial signal for the D2D communication to the second user equipment through the allocated resource, scanning by the first user equipment a response signal transmitted from the second user equipment, and if the first user equipment receives the response signal from the second user equipment, performing the D2D communication with the second user equipment, wherein the initial signal includes a first reference signal for matching synchronization between the first user equipment and the second user equipment and a second reference signal for a channel estimation between the first user equipment and the second user equipment.

To further achieve these and other advantages and in accordance with the purpose of the present invention, as embodied and broadly described, a user equipment, which performs a D2D (device-to-device) communication in a wireless access system supportive of the D2D communication, according to another embodiment of the present invention includes an RF (radio frequency) unit configured to transceive radio signals and a processor receiving a resource allocation information for the D2D communication with a second user equipment from a base station, the processor transmitting an initial signal for the D2D communication to the second user equipment through the allocated resource, the processor scanning a response signal transmitted from the second user equipment, the processor, if receiving the response signal from the second user equipment, performing the D2D communication with the second user equipment, wherein the initial signal includes a first reference signal for matching synchronization between the user equipment and the second user equipment and a second reference signal for a channel estimation between the user equipment and the second user equipment.

Preferably, the method further includes the step of if the response signal is not received for a preset time after transmitting the first reference signal and the second reference signal, retransmitting the initial signal to the second user equipment or transmitting a signal for checking a D2D communication link with the second user equipment to the second user equipment.

Preferably, the method further includes the step of if the number of retransmissions of the initial signal or the number of transmissions of the signal for checking the link exceeds a preset count, transmitting a signal for checking whether the resource allocation and the D2D communication request are completed to the base station.

Preferably, the initial signal includes an interference information on measuring interference caused by adjacent user equipments of the first user equipment.

Preferably, a preset fixed MCS (modulation and coding scheme) value or a preset fixed modulation order is used for a transmission of the interference information.

Preferably, the first reference signal and the second reference signal are identical to each other.

Preferably, one of the first reference signal and the second reference signal includes a DMRS (demodulation reference signal).

To further achieve these and other advantages and in accordance with the purpose of the present invention, as embodied and broadly described, a method of performing a D2D (device-to-device) communication in a wireless access system supportive of the D2D communication according to one embodiment of the present invention includes the steps of receiving by a first user equipment a resource allocation information for the D2D communication with a second user equipment from a base station, scanning by the first user equipment an initial signal for the D2D communication transmitted from the second user equipment through the allocated resource, and if the first user equipment receives the initial signal from the second user equipment, transmitting a response signal to the second user equipment, wherein the initial signal includes a first reference signal for matching synchronization between the first user equipment and the second user equipment and a second reference signal for a channel estimation between the first user equipment and the second user equipment.

To further achieve these and other advantages and in accordance with the purpose of the present invention, as embodied and broadly described, a user equipment, which performs a D2D (device-to-device) communication in a wireless access system supportive of the D2D communication, according to another embodiment of the present invention includes an RF (radio frequency) unit configured to transceive radio signals and a processor receiving a resource allocation information for the D2D communication with a second user equipment from a base station, the processor scanning an initial signal for the D2D communication transmitted from the second user equipment through the allocated resource, the processor, if receiving the initial signal from the second user equipment, transmitting a response signal to the second user equipment, wherein the initial signal includes a first reference signal for matching synchronization between the user equipment and the second user equipment and a second reference signal for a channel estimation between the user equipment and the second user equipment.

Preferably, the method further includes the step of if the initial signal is not received for a preset time after receiving the resource allocation information, transmitting a signal for checking whether the resource allocation and the D2D communication request are completed to the base station.

Preferably, the initial signal includes an interference information on measuring interference caused by adjacent user equipments of the first user equipment.

Preferably, a preset fixed MCS (modulation and coding scheme) value or a preset fixed modulation order is used for a transmission of the interference information.

Preferably, the first reference signal and the second reference signal are identical to each other.

Preferably, one of the first reference signal and the second reference signal includes a DMRS (demodulation reference signal).

Advantageous Effects

According to an embodiment of the present invention, data can be smoothly transceived between user equipments in a wireless access system, and more preferably, in a D2D communication supportive wireless access system.

According to an embodiment of the present invention, a D2D communication can be smoothly initiated by defining an initial signal in a D2D communication.

According to an embodiment of the present invention, synchronization is smoothly set between user equipments performing a D2D communication with each other, thereby preventing a problem from being caused by mobility and synchronization mismatch of a user equipment and apparatus therefor.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 and FIG. 7 are diagrams for examples of applying a D2D communication.

BEST MODE FOR INVENTION

Figure 1:
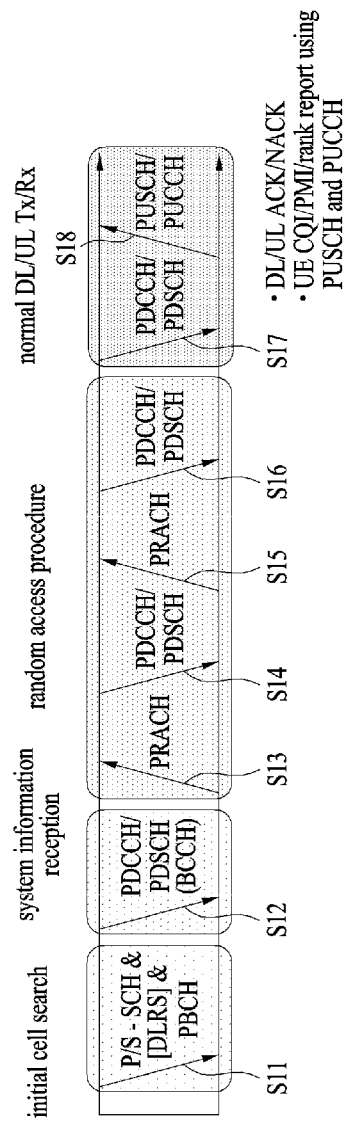
FIG. 1 is a diagram for explaining physical channels used for 3GPP system and a signal transmission using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transceiving relation between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, and 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE-A System to which the Present Invention is Applicable

FIG. 1 is a diagram for explaining physical channels used for 3GPP system and a signal transmission using the same.

First of all, if a power of a user equipment is turned on or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S12].

Subsequently, the user equipment may be able to perform a random access procedure to complete the access to the base station [S13 to S16]. To this end, the user equipment may transmit a specific sequence as a preamble via a physical random access channel (PRACH) [S13] and may be then able to receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
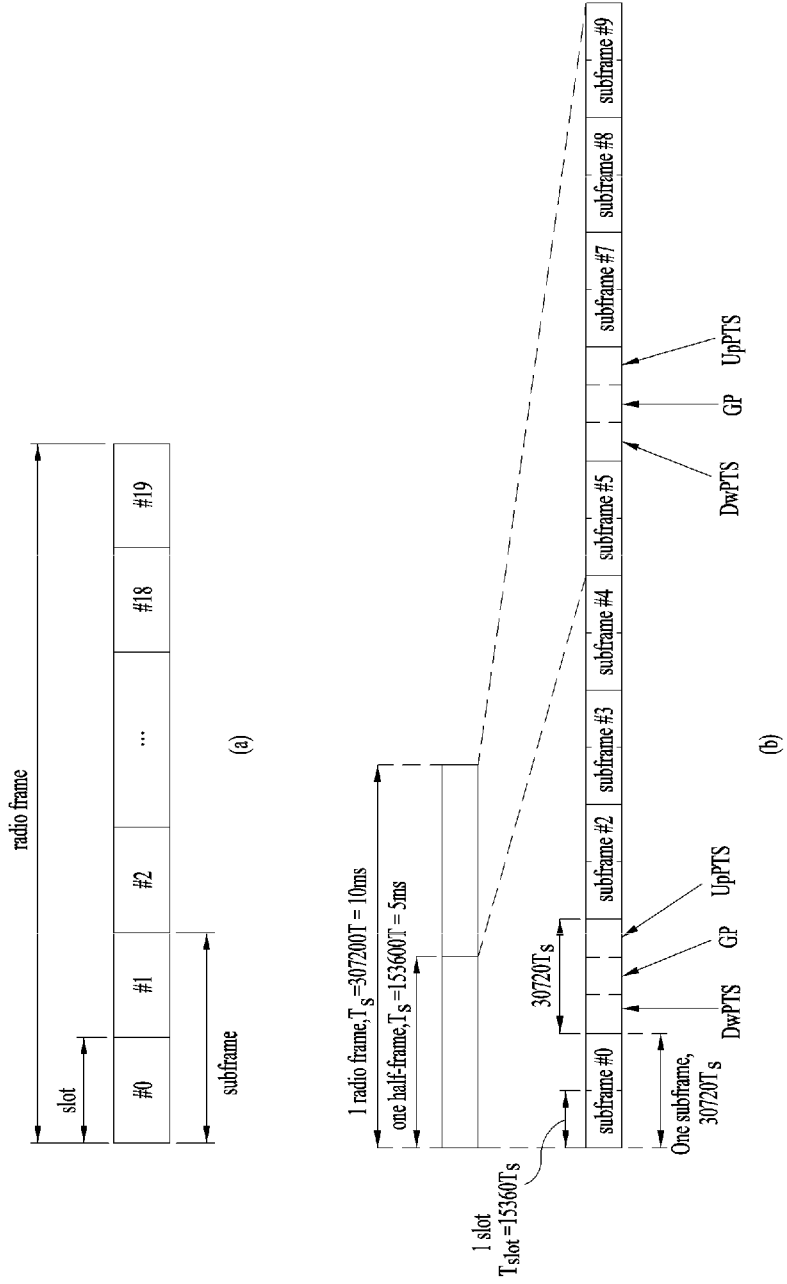
FIG. 2 is a diagram for a structure of a radio frame in 3GPP LTE.

FIG. 2 shows structures of radio frames in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) shows one example of a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP system uses OFDMA in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (b) shows a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multipath delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
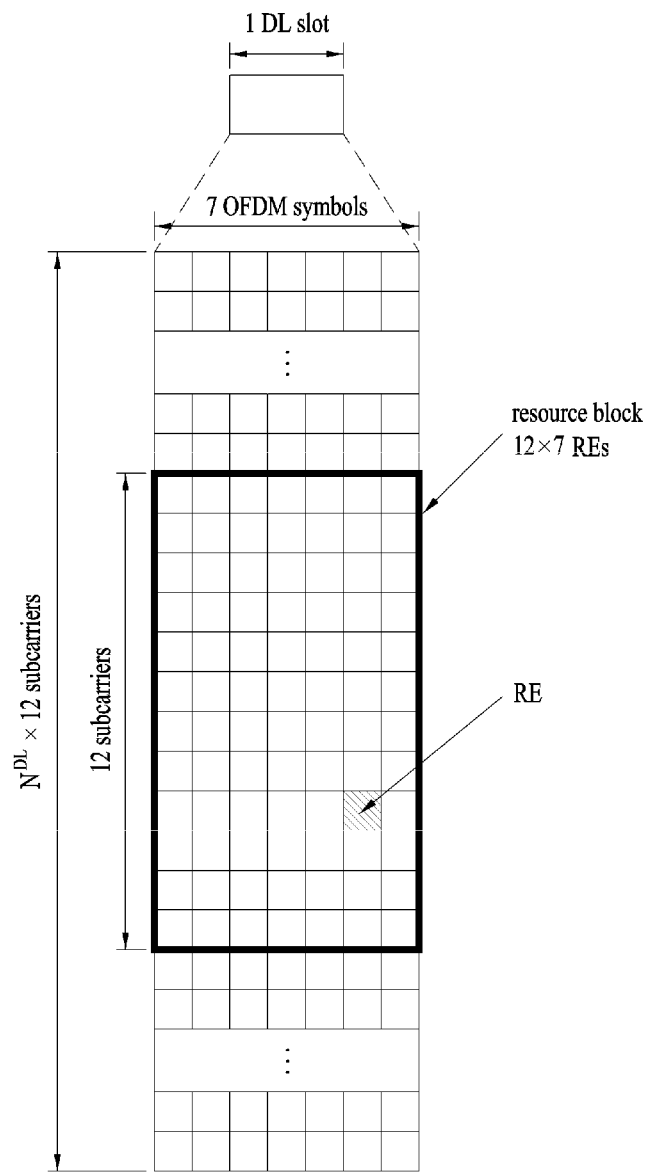
FIG. 3 is a diagram for one example of a resource grid for a downlink slot.

FIG. 3 is a diagram for one example of a resource grid for a downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
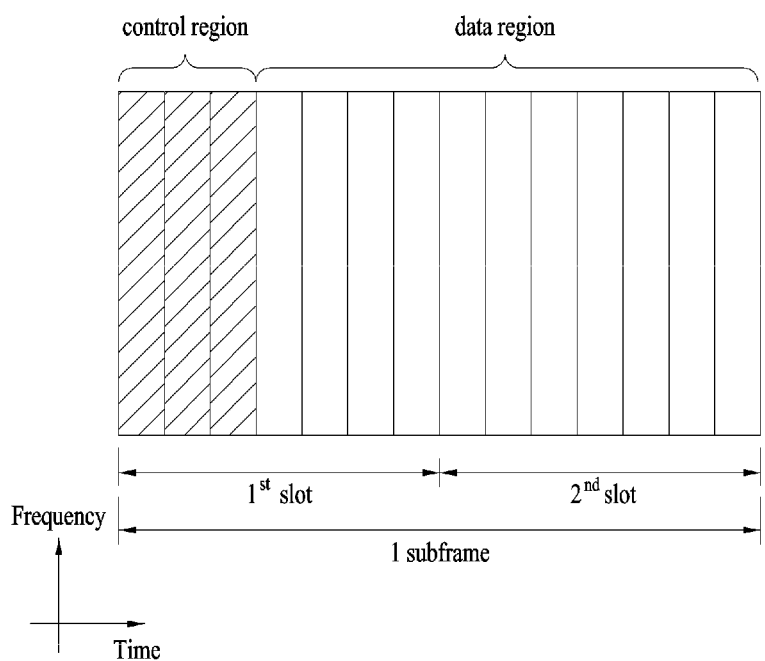
FIG. 4 is a diagram for a structure of a downlink subframe.

FIG. 4 shows a structure of a downlink (DL) subframe.

Referring to FIG. 4, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried on PDCCH may be called downlink control information (hereinafter abbreviated DCI). The DCI may include UL resource allocation information, DL resource allocation information or a UL transmission (Tx) power control command for a random UE (user equipment) group.

Figure 5:
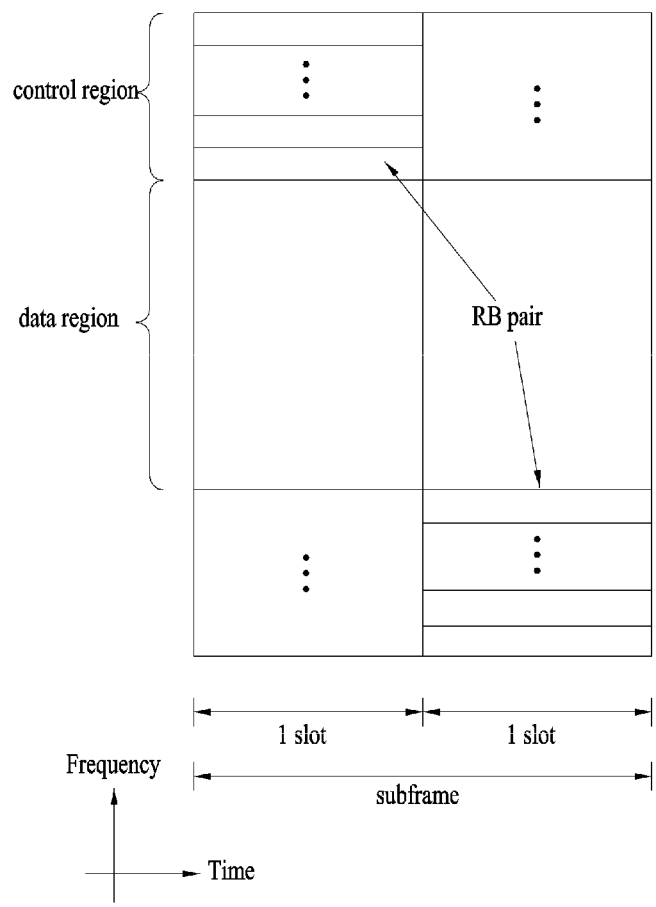
FIG. 5 is a diagram for a structure of an uplink subframe.

FIG. 5 shows a structure of an uplink (UL) subframe.

Referring to FIG. 5, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

2. The General of D2D (Device-to-Device) Communication

In a short range communication, a communication between user equipments (i.e., D2D communication) may be generally defined as a peer-to-peer form. These communication subjects reciprocally perform a communication by defining a random access protocol in-between and do not need to consider whether one of the communication subjects is actually connected to a public internet network.

On the contrary, a communication in a cellular network should be defined as a communication between a base station and a user equipment or a communication between an entity equivalent to a base station and a user equipment. And, the whole communication behaviors are controlled by the base station or the entity equivalent to the base station. Under this protocol, the cellular network restricts behaviors of all user equipments by a predetermined rule, thereby enabling a structure for obtaining maximum throughput. Yet, this rule may have over-ruled aspects depending on an application or a channel environment of a user equipment. For instance, a base station determines a power to be consumed for a transmission of the same data traffic by a user equipment and all behaviors of the user equipment for the transmission of the same data traffic should work under the control of the base station in a manner that the base station is placed in the middle for a short range communication as well. In order to achieve a short range communication with low power consumption, a user equipment should have a structure of utilizing another radio access technology (RAT) or accept the inconvenience of the cellular network. According to such a structural problem, since a channel environment of a user equipment is vulnerable, when the user equipment accesses a network, some restrictions are put on the user equipment that uses an optimal communication path by searching for a new access path.

FIG. 6 and FIG. 7 are diagrams for examples of applying a D2D communication.

If a propagation loss between a source user equipment and a base station is considerable or a channel equality is equal to or lower than a predetermined level, a D2D communication can be triggered. For instance, referring to FIG. 6 (a), when a plurality of terminals are located in a room, a channel status may be changed depending on a user equipment location. Hence, the source user equipment can improve data throughput through a D2D communication or raise a data reception quality. Moreover, referring to FIG. 6 (b), as a source user equipment is located on an alley between tall buildings, although the source user equipment is included in a radio shadow area, if the source user equipment has a good channel state with another nearby user equipment, the source user equipment communicates with the nearby user equipment and the user equipment in a good channel state communicates with a base station. Therefore, it is able to enhance power efficiency and throughput of the user equipment that becomes a source of data traffic. Thus, if a plurality of user equipments exist and are managed, when a server accesses each of the user equipments through a base station, it is able to consider a model that a specific user equipment plays a role as an aggregator for a plurality of the user equipments.

For another instance, referring to FIG. 7, if a user equipment intends to communicate with a nearby user equipment by utilizing an RAT of cellular only without using an RAT different from that of the cellular, a corresponding data exchange is controlled by a base station. Yet, even if user equipments are located so close to each other, data transceived between the user equipments should be forwarded to a base station and then retransmitted to the destined user equipment. Thus, such a structure is companied by an unreasonable communication structure. In doing so, if an owner, which manages user equipments performing a direct D2D communication, manages the corresponding user equipments in a manner of being located adjacent to the corresponding user equipments, it is preferable that data is directly delivered to a managed user equipment of the corresponding owner rather than forwarded to a base station.

In doing so, comparing the above-mentioned case to a case of using another RAT (e.g., WiFi, Bluetooth, Zigbee, etc.), since a user equipment does not need to include a model for multiple RATs, it is able to configure an inexpensive eco-system. Since the multiple RATs are not used, it is unnecessary to implement a processing configuration for unnecessary application layers. Moreover, if an air-interface for a D2D communication and an air-interface for a UE-to-BS (user equipment-to-base station) communication are combinably designed on the single-RAT basis, it is able to overcome the inefficiency in case that the air-interfaces are independently designed on the multi-RAT basis. In particular, if a short range communication and a cellular network access are allowed by utilizing a single RAT, it is able to configure an eco-system of very efficient D2D devices. These features are applicable to user devices (i.e., human devices) likewise. In doing so, it is able to perform both a short range communication and a long range communication through a device of less complexity with small power. And, it is possible to perform an active QoS (quality of service) management for efficiently maintaining a power consumption level and a throughput management.

In the following description, a direct D2D communication means a method of performing a direct communication between user equipments without using a base station in a situation that a channel state between at least two user equipments is good or user equipments are located adjacent to each other. In doing so, although data is exchanged between the user equipments through the direct communication, the D2D communication associated with the present invention differs from such a communication for exchanging data between user equipments without involvement of a base station as a Bluetooth communication, an infrared ray communication and the like in that prescribed control information for a D2D communication is provided by a base station.

The aforementioned direct D2D communication can be used together with such a terminology as a device-to-device (D2D) communication, a mobile station-to-mobile station (MS-to-MS, M2M) communication, a peer-to-peer (P2P) communication and the like. For clarity of the following description, 'D2D communication' is generally used to describe embodiments of the present invention. And, 'D2D UE (user equipment)' means a user equipment (UE) that supports a D2D communication.

3. Method of Performing a D2D Communication

An initial transmission performed after receiving allocation of resource for a D2D communication differs from an existing initial transmission with a cellular network in that each D2D user equipment is aware of the resource for the D2D communication.

Moreover, in case that a D2D communication is performed by sharing resource with an existing cellular network, it may cause a problem that synchronization (e.g., subframe time synchronization) between a user equipment currently performing a cellular network communication and a D2D user equipment currently performing the D2D communication is mismatched or a problem that synchronization (e.g., subframe time synchronization) between D2D user equipments currently performing the D2D communication with different D2D user equipments is mismatched. In case of the user equipment currently using the cellular network, although the corresponding user equipment transmits a signal by matching synchronization with a base station, since the user equipment currently using the cellular network differs from the D2D user equipment currently performing the D2D communication in delays attributed to paths, inter-carrier interference is caused to the D2D user equipment currently performing the D2D communication due to the mismatch of the synchronization. Hence, a method of preventing performance degradation due to the inter-carrier interference is necessary.

In case of a D2D communication, although a D2D user equipment can match coarse synchronization mutually using a base station of a cellular network, since the D2D user equipment differs from the cellular network in path, it may cause a problem that fine synchronization between D2D user equipments performing a direct communication with each other is different from synchronization between D2D user equipments currently performing the D2D communication with different D2D user equipments. Besides, it may be difficult to transmit data on a DL channel structure due to hardware (H/W) limitation of a D2D user equipment in a D2D communication. And, it may be preferable that data is transmitted on a UL channel structure. In this case, a reference signal (or a synchronization signal) for matching fine synchronization is required for a D2D communication between D2D user equipments performing the D2D communication. In particular, unlike the cellular network, in a direct communication unable to avoid restrictions put on transmission powers of transmitting and receiving D2D user equipments to minimize interference with other user equipments, since a process for matching synchronization precisely is closely related to data transmission performance, it is very important to set up a reference signal for synchronization.

In the following description, the present invention proposes a method of transmitting an initial signal (e.g., data, a reference signal, etc.) in a D2D communication for directly transceiving data between user equipments after completion of resource allocation for the D2D communication. In the present specification, a signal for matching synchronization between D2D user equipments for a D2D communication or a signal for channel estimation between D2D user equipments shall be generally named 'D2D reference signal'. In the following description, a signal for matching synchronization between D2D user equipments for a D2D communication or a signal for channel estimation between D2D user equipments may be configured with the same or different signals, respectively.

Meanwhile, after a user equipment (hereinafter named 'source user equipment (source UE)') desiring a D2D communication has discovered a user equipment (hereinafter named 'target/destination user equipment (target/destination UE)') that becomes a target of the D2D communication, the source user equipment has to confirm whether the target user equipment accepts the D2D communication through a D2D request. In particular, a procedure for the D2D request means a procedure for the source user equipment to query whether the target user equipment accepts the D2D communication before receiving allocation of resource for performing the D2D communication with the target user equipment after the discovery of the target user equipment for performing the D2D communication together. For clarity of the following description, assume a case that a source user equipment sends a message for confirming an acceptance or declination of a D2D communication to a target user equipment through a base station or directly. And, assume a case that the target user equipment accepts the D2D communication.

Figure 8:
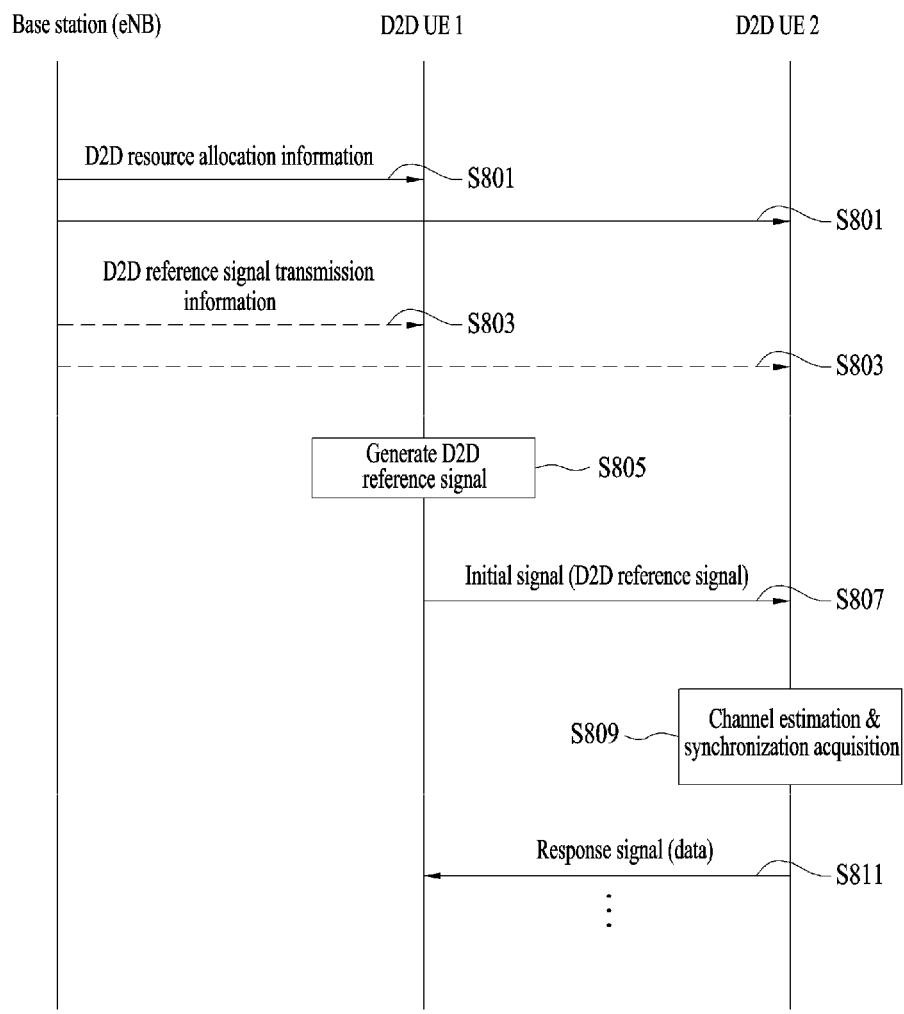
FIG. 8 is a diagram for one example of a method of performing a D2D communication according to one embodiment of the present invention.

FIG. 8 is a diagram for one example of a method of performing a D2D communication according to one embodiment of the present invention. In FIG. 8, a D2D user equipment 1 and a D2D user equipment 2 can become a source user equipment and a target user equipment, respectively, and vice versa.

Referring to FIG. 8, a base station can transmit a resource allocation information for a D2D communication to a D2D user equipment 1 and a D2D user equipment 2 [S801]. In this case, a resource allocated for the D2D communication by the base station may further include a guard time, which is added to a resource necessary (or required) for the D2D user equipment 1 and the D2D user equipment 2 to perform the D2D communication, for preventing interference with another user equipment currently communicating with a cellular network or interference with another user equipment currently performing the D2D communication.

A source user equipment intending to initiate a D2D communication with a target user equipment is able to make a request for a resource allocation for the D2D communication to a base station [not shown in the drawing]. In response to the request, the base station is then able to transmit a resource allocation information to each of the source user equipment and the target user equipment. Moreover, after the source user equipment intending to perform a D2D communication has made a D2D request to the base station in order to make a request for the D2D communication with the target user equipment, if the base station sends a message for querying an acceptance or declination of the D2D communication to the target user equipment in response to the D2D request and then receives a response of the acceptance of the D2D communication from the target user equipment [not shown in the drawing], the base station may be able to transmit the resource allocation information to each of the source user equipment and the target user equipment.

The base station can transmit a D2D reference signal transmission information to each of the D2D user equipment 1 and the D2D user equipment 2 [S803]. In this case, the D2D reference signal transmission information may include an allocation information (e.g., a D2D reference signal carried symbol index, a D2D reference signal carried frequency band, etc.) of a resource for carrying a D2D reference signal, a sequence information of the D2D reference signal and/or the like. Yet, for clarity of the description with reference to FIG. 8, the step of transmitting the D2D reference signal transmission information is performed after the step of transmitting the D2D resource allocation information, by which the present invention may be non-limited. Alternatively, the step of transmitting the D2D reference signal transmission information can be performed before the step of transmitting the D2D resource allocation information. In particular, the step S803 can be performed before the step S801.

Moreover, the D2D reference signal transmission information can be transmitted to each of the D2D user equipments in a manner of being contained in the D2D resource allocation information, and the D2D reference signal information may be previously determined so as to be known to the base station and the D2D user equipments in advance. In this case, the step S803 of transmitting the D2D reference signal transmission information can be skipped.

The D2D user equipment 1 generates a D2D reference signal for matching synchronization between the D2D user equipments and estimating a channel between the D2D user equipments [S805]. In particular, if a reference signal for matching the synchronization between the D2D user equipments is different from a reference signal for the channel estimation between the D2D user equipments, the D2D user equipment 1 generates the corresponding signals respectively. Yet, if the two reference signals correspond to the same signal, the D2D user equipment 1 can generate a single signal only.

Subsequently, the D2D user equipment 1 transmits an initial signal for the D2D communication to the D2D user equipment 2 [S807]. In this case, the initial signal means a signal that is initially transmitted to the D2D user equipment 2 by the D2D user equipment 1 in order to initiate the D2D communication. In this case, the initial signal for the D2D communication may include the D2D reference signal for the synchronization match and channel estimation only.

The initial signal may include an interference information on a measurement of interference possibly caused by adjacent user equipments to the D2D user equipment 1 for the resource (or channel) allocated to the D2D user equipment 1 and the D2D user equipment 2. And, a resource information for the D2D user equipment 2 to transmit a response signal can be included in the initial signal of the D2D user equipment 1.

In case that the D2D user equipment 2 receives the initial signal for the D2D communication from the D2D user equipment 1, the D2D user equipment 2 performs a channel measurement using the D2D reference signal included in the initial signal and then acquires synchronization [S811]. If the reference signal for matching the synchronization between the D2D user equipments is different from the reference signal for the channel estimation between the D2D user equipments, the D2D user equipment 2 performs the channel estimation by matching the synchronization using each of the reference signals. If the reference signal for matching the synchronization between the D2D user equipments is equal to the reference signal for the channel estimation between the D2D user equipments, the D2D user equipment 2 is able to perform the channel estimation by matching the synchronization using one of the reference signals only.

Subsequently, the D2D user equipment 2 transmits a response signal containing data to the D2D user equipment 1 [S811]. In doing so, the D2D user equipment 2 can transmit a reference signal for the channel estimation to the D2D user equipment 1 together with the data. Thereafter, the D2D user equipment 1 and the D2D user equipment 2 perform the D2D communication by directly transceiving data with each other. And, the D2D user equipment 1 and the D2D user equipment 2 can perform synchronization correction and/or channel estimation by transceiving a reference signal with each other together with the data.

As mentioned in the foregoing description, in the step S807, the resource information for the D2D user equipment 2 to transmit the response signal can be included in the initial signal of the D2D user equipment 1 and the D2D user equipment 2 can transmit the response signal using the resource information included in the initial signal. Moreover, the response signal can be transmitted using the resource information allocated in the step S801. For clarity of the description with reference to FIG. 8, the step S801 is shown only as a resource allocation step. Yet, in order for the D2D user equipment 2 to transmit the response signal, a step of receiving an allocation of a resource for the response signal from the base station can be added. Thereafter, each of the D2D user equipments can receive allocation of a resource for transmitting each signal in the course of transceiving a signal for the D2D communication with a counterpart D2D user equipment.

In the following description, in a D2D communication, a D2D reference signal for matching synchronization between D2D user equipments and estimating a channel between the D2D user equipments, an initial transmission for a communication between the D2D user equipments, and corresponding operations of the D2D user equipments are described in detail.

3.1. D2D Reference Signal

A D2D reference signal can be mapped across a full frequency band in a manner of selecting a specific symbol of an allocated physical resource block/resource block (PRB/RB).

Figure 9:
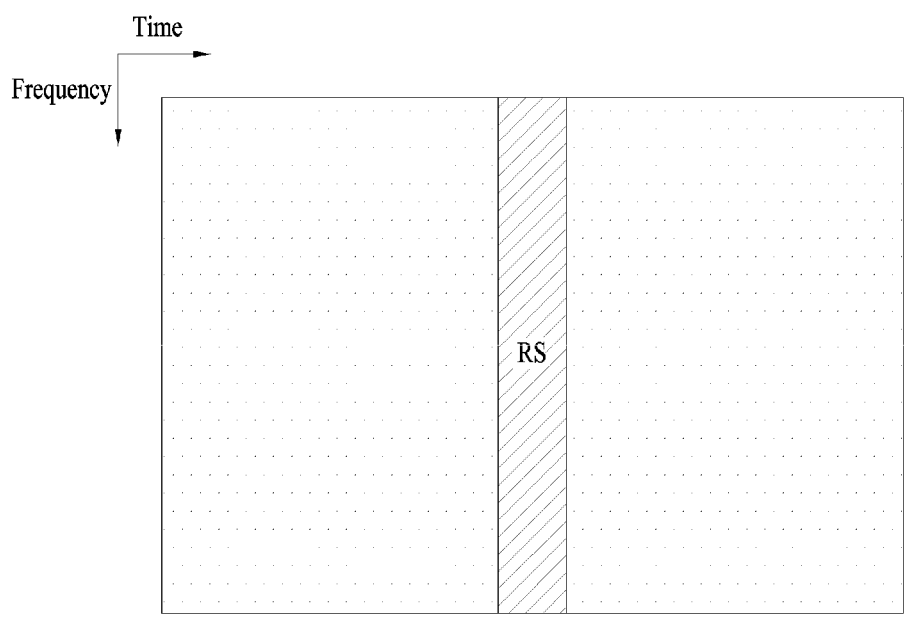
FIG. 9 is a diagram for one example of a structure of a subframe having a D2D reference signal transmitted therein according to one embodiment of the present invention.

FIG. 9 is a diagram for one example of a structure of a subframe having a D2D reference signal transmitted therein according to one embodiment of the present invention.

Referring to FIG. 9, a D2D reference signal is located at a determined symbol of an allocated PRB/RB, which is located across an assigned full frequency band. In particular, the D2D reference signal is transmitted on a full frequency band in a symbol of a corresponding time. In this case, as information on a sequence of the D2D reference signal and the like is determined previously, a D2D user equipment and a base station may be aware of such information. And, the base station may be able to provide the corresponding information through RRC (radio resource control) signaling or cell common control information.

The number of symbols having the D2D reference signal mapped thereto may be at least one per subframe (or radio frame). For instance, the D2D reference signal can be mapped to 2 symbols per subframe in a manner of being mapped to 1 symbol per 1 subframe or 1 symbol per 1 slot. In doing so, in case that the D2D reference signal is mapped to 1 symbol per 1 subframe, the mapping location may correspond to a symbol located at the center of a first slot (or a second slot). In case that the D2D reference signal is mapped to 1 symbol per 1 slot, the mapping location may correspond to a symbol located at the center of each slot. For instance, in case of a normal cyclic prefix, the D2D reference signal can be mapped to a $4^{th}$ symbol of a slot. In case of an extended cyclic prefix, the D2D reference signal can be mapped to a $3^{rd}$ or $4^{th}$ symbol of a slot.

In this case, if a signal is not transmitted on a partial frequency band of the full frequency band of the allocated PRB/RB due to a reason such as an interference management and the like, the D2D reference signal may not be mapped to the corresponding frequency band.

Thus, as mentioned in the foregoing description, the D2D reference signal can be used for a channel estimation (or a channel quality measurement) as well as for the synchronization between D2D user equipments.

Meanwhile, as mentioned in the foregoing description, it may be difficult to transmit data on a DL channel structure due to hardware (H/W) limitation of a D2D user equipment in a D2D communication. And, it may be preferable that data is transmitted on a UL channel structure. In this case, a separate reference signal (or a synchronization signal) for the D2D user equipment to match synchronization between D2D user equipments may not be defined. For instance, in case that D2D user equipments mutually perform a D2D communication using a UL channel structure of 3GPP LTE/LTE-A system, it is able to match synchronization between the D2D user equipments using a UL reference signal (e.g., a demodulation reference signal (DMRS)).

In doing so, since the D2D user equipment receiving data through the D2D communication should be aware of information on a reference signal of the D2D user equipment transmitting the data, a base station is able to inform the data receiving D2D user equipment of the information on the reference signal. For instance, the base station can inform the data receiving D2D user equipment of information such as a region of a resource block allocated to the D2D user equipment transmitting the data through the D2D communication, a sequence of the reference signal, and/or the like. In doing so, the base station is able to inform the data receiving D2D user equipment of the corresponding information using RRC signaling or PDSCH. Moreover, the base station defines a new downlink control information (DCI) format and is able to inform the data receiving D2D user equipment of the information through PDCCH using the newly defined DCI format.

Thus, in case of performing the D2D communication using the UL channel structure, the process for matching the synchronization between D2D user equipments and the channel estimation process can be performed as follows.

First of all, when synchronization for a D2D communication is initially set, a D2D user equipment receiving data through the D2D communication is able to match the synchronization by reading a D2D reference signal only while ignoring data carried on PRB/RB having the D2D reference signal carried thereon (if the data is transmitted). Subsequently, the data receiving D2D user equipment acquires the synchronization using the D2D reference signal and then receives the data by starting with a subframe scheduled to transmit D2D data. From this time on, the D2D reference signal can play roles for synchronization correction and channel estimation.

Moreover, when synchronization for a D2D communication is initially set, a D2D user equipment transmitting a D2D reference signal is able to transmit a resource information for a response to a counterpart D2D user equipment. In particular, if the D2D user equipment receiving the D2D reference signal fails in receiving allocation of a resource for a response to the D2D reference signal from a base station, the D2D user equipment transmitting the D2D reference signal is able to transmit the resource information for the response together with the D2D reference signal.

Figure 10:
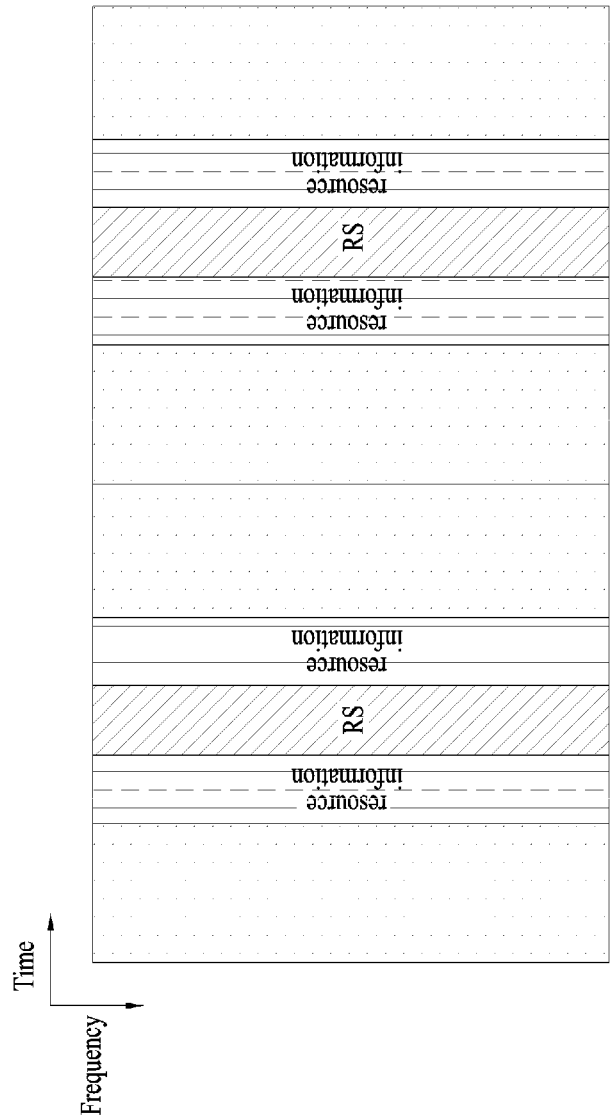
FIG. 10 is a diagram for one example of a structure of a subframe having a D2D reference signal transmitted therein according to one embodiment of the present invention.

FIG. 10 is a diagram for one example of a structure of a subframe having a D2D reference signal transmitted therein according to one embodiment of the present invention.

Referring to FIG. 10, a resource information for a response to a D2D reference signal for synchronization can be transmitted in form of data except the D2D reference signal (RS). In this case, the resource information for the response to the D2D reference signal can be mapped to symbols located next to both sides of the D2D reference signal. And, the resource information can be mapped to a full frequency band assigned to a D2D user equipment like the D2D reference signal. Moreover, the resource information can be mapped to a band partially determined in an increasing direction (e.g., a bottom-to-top direction) of a subcarrier index from a smallest carrier index.

In case that at least one D2D reference signal is mapped per 1 subframe, the resource information for the response to the D2D reference signal can be mapped to symbols located next to both sides of the D2D reference signal transmitted in a prescribed slot (e.g., a first slot, a second slot, etc.) of a subframe. And, the resource information can be mapped to a full frequency band assigned to a D2D user equipment like the D2D reference signal. Moreover, the resource information can be mapped to a band partially determined in an increasing direction (e.g., a bottom-to-top direction) of a subcarrier index from a smallest carrier index.

Unlike the example shown in FIG. 10, the resource information for the response to the D2D reference signal is not transmitted in form of data separate from the D2D reference signal but can be transmitted in a manner of being included in the D2D reference signal. For instance, the resource information for the response to the D2D reference signal can be included in form of an initial value or phase of the D2D reference signal.

3.2. Initial Transmission by Target User Equipment (UE)

In a D2D communication, after a resource for the D2D communication has been allocated through a D2D request (or a D2D resource allocation request), a target user equipment is able to start an initial transmission. In particular, after the initial transmission has been performed by the target user equipment, a source user equipment is able to perform a response transmission to the target user equipment.

3.2.1. Initial Transmission

1) In case that a target user equipment performs an initial transmission, a reference signal for a channel measurement and a reference signal for synchronization acquisition can be transmitted in the initial transmission. In this case, the reference signal (i.e., a reference signal for a channel measurement or a reference signal for synchronization acquisition) is transmitted at the same location of an existing reference signal (e.g., a demodulation reference signal (DMRS)) used in uplink and may use the same signal. The reference signal (i.e., a reference signal for a channel measurement or a reference signal for synchronization acquisition) is transmitted at the same location of an existing reference signal used in uplink and may use a different signal. The reference signal (i.e., a reference signal for a channel measurement or a reference signal for synchronization acquisition) is transmitted at a location different from that of an existing reference signal used in uplink and may use the same signal. For instance, the reference signal can be transmitted in a foremost symbol of each subframe or slot. And, the reference signal (i.e., a reference signal for a channel measurement or a reference signal for synchronization acquisition) is transmitted at a location different from that of an existing reference signal used in uplink and may use a different signal. For instance, the reference signal can be transmitted in a foremost symbol of each subframe or slot.

And, the channel measurement and the synchronization acquisition can be performed by the same reference signal. In particular, the target user equipment transmits a reference signal of one type only. The source user equipment is then able to perform a channel measurement and a synchronization alignment using the received reference signal of the one type only.

2) In case that a target user equipment performs an initial transmission, a reference signal (e.g., a reference signal of one type or a different reference signal) for a channel measurement and a synchronization acquisition and an information other than the reference signal can be transmitted together in the initial transmission. For instance, when the target user equipment transmits a reference signal (e.g., a reference signal of one type or a different reference signal) for a channel measurement and a synchronization acquisition and an information other than the reference signal in the initial transmission, an interference information of the target user equipment can be included in the corresponding information. In this case, the interference information means the information on measuring interference possibly caused by adjacent user equipments to the target user equipment for a resource (or channel) currently allocated for a D2D communication between the source user equipment and the target user equipment. Moreover, when the target user equipment performs the initial transmission, the interference information of the target user equipment may be transmitted in a subframe next to a subframe for transmitting a reference signal (e.g., a reference signal of one type or a different reference signal) for a channel measurement and a synchronization acquisition. In particular, a plurality of subframes can be allocated for the initial transmission of the target user equipment. In this case, the interference information measured by the target user equipment can be transmitted in a subframe next to a subframe for transmitting the reference signal for the channel measurement and the synchronization acquisition. Thus, by transmitting the interference information of the target user equipment together, it is able to help the source user equipment to determine a transmission power of a response transmission (e.g., an initial transmission of the source user equipment) to the target user equipment.

As mentioned in the above description, in case that a reference signal (e.g., a reference signal of one type or a different reference signal) for a channel measurement and a synchronization acquisition and an information other than the reference signal are transmitted together in an initial transmission of a target user equipment, an MCS (modulation and coding scheme) level for the corresponding information transmission can use a value fixed constantly in advance. For instance, if data is transmitted together in the initial transmission (in the same subframe or a next subframe), an MCS level of the corresponding data can use a lowest value (or a robust value). Moreover, it is able to use a value of which modulation order is constantly fixed only in advance irrespective of a coding rate. For instance, the target user equipment modulates the data using QPSK (quadrature phase shift keying) or BPSK (binary phase shift keying) only and is then able to transmit a modulated data symbol to the source user equipment.

3) In case of an initial transmission by a target user equipment, a transmission power of a reference signal can be fixed to a specific value in advance. For instance, the reference of the initial transmission can be always transmitted at the maximum power.

4) When a source user equipment receives an initial transmission from a target user equipment and then performs a response transmission (i.e., an initial transmission of the source user equipment) to the target user equipment, the source user equipment is able to calculate an initial transmission power from the initial transmission received from the target user equipment. For instance, based on a channel measurement value measured through a reference signal received from the target user equipment, an interference information received from the target user equipment and the like, the source user equipment can calculate a transmission power for its initial transmission. Data to be transmitted by the source user equipment can be transmitted together with a reference signal in a response transmission of the source user equipment.

3.2.2. D2D Signal Transceiving Process—Search Window Setting

1) A target user equipment sets up a search window after elapse of a predetermined time or subframe from an initial transmission and is then able to scan a signal (e.g., a response signal) or data transmitted from a source user equipment. For instance, the target user equipment is able to scan a signal received for 4 ms (or 4 subframes) by starting with 2 ms (or 2 subframes) from the initial transmission. For another instance, the target user equipment is able to scan a signal received for 4 ms (or 4 subframes) by starting with 3 ms (or 3 subframes) from the initial transmission.

If the target user equipment is unable to receive a signal (e.g., a response signal) transmitted from the source user equipment in the above-determined window, the target user equipment retransmits an initial transmission to the source user equipment or can transmit a signal for checking a D2D link to the source user equipment.

Assuming that the source user equipment receives the initial transmission of the target user equipment and then makes a response to the received initial transmission or performs a data transmission, the timing or subframe for retransmitting the initial transmission or transmitting the signal for checking the D2D link may include a subframe or time (timing point) corresponding to the window searched by the source user equipment for the corresponding response made by the target user equipment. In particular, since the source user equipment retains the window for searching for a signal for a predetermined time or subframe in order to receive a response signal from the target user equipment after the response to the initial transmission received from the target user equipment or the data transmission from the target user equipment, the target user equipment is able to retransmit the initial transmission to the source user equipment within the corresponding window or transmit the signal for the link check to the source user equipment within the corresponding window. In more particular, a retransmission of an initial transmission or a signal for checking a D2D link can be transmitted in a corresponding subframe or time within a window searched by a counterpart user equipment.

In doing so, if the number of retransmissions of the initial transmission or the number of transmissions of the signal for checking the D2D link exceeds a predetermined count, the target user equipment is able to transmit a signal for checking a resource allocation, a D2D request completion status and/or the like to a base station. In particular, the target user equipment can transmit a signal for checking whether a resource allocation information understood by the target user equipment is correct and/or whether a D2D request procedure is correctly completed [e.g., whether a D2D communication requesting user equipment and a D2D communication accepting user equipment are correct, etc.] to the base station.

2) A source user equipment sets up a search window after elapse of a predetermined time or subframe from an allocation of a resource in response to a D2D request and is then able to scan an initial transmission transmitted from a target user equipment. For instance, the source user equipment is able to scan a signal received for 4 ms (or 4 subframes) by starting with 2 ms (or 2 subframes) from the resource allocation. For another instance, the source user equipment is able to scan a signal received for 4 ms (or 4 subframes) by starting with 3 ms (or 3 subframes) from the resource allocation.

If the source user equipment is unable to receive the signal (or initial transmission) transmitted from the target user equipment in the above-determined window, the source user equipment can transmit a signal for checking a D2D link to the target user equipment.

Assuming that the target user equipment receives the resource allocation after the D2D request and then performs the initial transmission, the timing or subframe for the source user equipment to transmit the signal for the D2D link may include a subframe or time (timing point) corresponding to the window searched by the target user equipment for the corresponding response or data transmission of the source user equipment. In particular, since the target user equipment retains the window for searching for a signal for a predetermined time or subframe in order to receive a response or data transmission from the source user equipment after the initial transmission to the source user equipment, the source user equipment is able to transmit the signal for the D2D link check to the target user equipment within the corresponding window. In more particular, a signal for a D2D link check can be transmitted in a corresponding subframe or time within a window searched by a counterpart user equipment.

In doing so, if the number of transmissions of the signal for checking the D2D link exceeds a predetermined count, the source user equipment is able to transmit a signal for checking a resource allocation, a D2D request completion status and/or the like to a base station. In particular, the source user equipment can transmit a signal for checking whether a resource allocation information understood by the source user equipment is correct and/or whether a D2D request procedure is correctly completed [e.g., whether a D2D communication requesting user equipment and a D2D communication accepting user equipment are correct, etc.] to the base station.

3.3. Initial Transmission by Source User Equipment (UE)

In a D2D communication, after a resource for the D2D communication has been allocated through a D2D request (or a D2D resource allocation request), a source user equipment is able to start an initial transmission. In particular, after the initial transmission has been performed by the source user equipment, a target user equipment is able to perform a response transmission to the source user equipment.

3.3. 1. Initial Transmission

1) In case that a source user equipment performs an initial transmission, a reference signal for a channel measurement and a reference signal for synchronization acquisition can be transmitted in the initial transmission. In this case, the reference signal (i.e., a reference signal for a channel measurement or a reference signal for synchronization acquisition) is transmitted at the same location of an existing reference signal (e.g., a demodulation reference signal (DMRS)) used in uplink and may use the same signal. The reference signal (i.e., a reference signal for a channel measurement or a reference signal for synchronization acquisition) is transmitted at the same location of an existing reference signal used in uplink and may use a different signal. The reference signal (i.e., a reference signal for a channel measurement or a reference signal for synchronization acquisition) is transmitted at a location different from that of an existing reference signal used in uplink and may use the same signal. For instance, the reference signal can be transmitted in a foremost symbol of each subframe or slot. And, the reference signal (i.e., a reference signal for a channel measurement or a reference signal for synchronization acquisition) is transmitted at a location different from that of an existing reference signal used in uplink and may use a different signal. For instance, the reference signal can be transmitted in a foremost symbol of each subframe or slot.

And, the channel measurement and the synchronization acquisition can be performed by the same reference signal. In particular, the source user equipment transmits a reference signal of one type only. The target user equipment is then able to perform a channel measurement and a synchronization alignment using the received reference signal of the one type only.

2) In case that a source user equipment performs an initial transmission, a reference signal (e.g., a reference signal of one type or a different reference signal) for a channel measurement and a synchronization acquisition and an information other than the reference signal can be transmitted together in the initial transmission. For instance, when the source user equipment transmits a reference signal (e.g., a reference signal of one type or a different reference signal) for a channel measurement and a synchronization acquisition and an information other than the reference signal in the initial transmission, an interference information of the target user equipment can be included in the corresponding information. In this case, the interference information means the information on measuring interference possibly caused by adjacent user equipments to the source user equipment for a resource (or channel) currently allocated for a D2D communication between the source user equipment and the target user equipment. Moreover, when the source user equipment performs the initial transmission, the interference information of the source user equipment may be transmitted in a subframe next to a subframe for transmitting a reference signal (e.g., a reference signal of one type or a different reference signal) for a channel measurement and a synchronization acquisition. In particular, a plurality of subframes can be allocated for the initial transmission of the source user equipment. In this case, the interference information measured by the source user equipment can be transmitted in a subframe next to a subframe for transmitting the reference signal for the channel measurement and the synchronization acquisition. Thus, by transmitting the interference information of the source user equipment together, it is able to help the target user equipment to determine a transmission power of a response transmission (e.g., an initial transmission of the target user equipment) to the source user equipment.

As mentioned in the above description, in case that a reference signal (e.g., a reference signal of one type or a different reference signal) for a channel measurement and a synchronization acquisition and an information other than the reference signal are transmitted together in an initial transmission of a source user equipment, an MCS (modulation and coding scheme) level for the corresponding information transmission can use a value fixed constantly in advance. For instance, if data is transmitted together in the initial transmission (in the same subframe or a next subframe), an MCS level of the corresponding data can use a lowest value (or a robust value). Moreover, it is able to use a value of which modulation order is constantly fixed only in advance irrespective of a coding rate. For instance, the source user equipment modulates the data using QPSK (quadrature phase shift keying) or BPSK (binary phase shift keying) only and is then able to transmit a modulated data symbol to the target user equipment.

3) In case of an initial transmission by a source user equipment, a transmission power of a reference signal can be fixed to a specific value in advance. For instance, the reference of the initial transmission can be always transmitted at the maximum power.

4) When a target user equipment receives an initial transmission from a source user equipment and then performs a response transmission (i.e., an initial transmission of the target user equipment) to the source user equipment, the target user equipment is able to calculate an initial transmission power from the initial transmission received from the source user equipment. For instance, based on a channel measurement value measured through a reference signal received from the source user equipment, an interference information received from the source user equipment and the like, the target user equipment can calculate a transmission power for its initial transmission. Data to be transmitted by the target user equipment can be transmitted together with a reference signal in a response transmission of the target user equipment.

3.3. 2. D2D Signal Transceiving Process—Search Window Setting

1) A source user equipment sets up a search window after elapse of a predetermined time or subframe from an initial transmission and is then able to scan a signal (e.g., a response signal) or data transmitted from a target user equipment. For instance, the source user equipment is able to scan a signal received for 4 ms (or 4 subframes) by starting with 2 ms (or 2 subframes) from the initial transmission. For another instance, the source user equipment is able to scan a signal received for 4 ms (or 4 subframes) by starting with 3 ms (or 3 subframes) from the initial transmission.

If the source user equipment is unable to receive a signal (e.g., a response signal) transmitted from the target user equipment in the above-determined window, the source user equipment retransmits an initial transmission to the target user equipment or can transmit a signal for checking a D2D link to the target user equipment.

Assuming that the target user equipment receives the initial transmission of the source user equipment and then makes a response to the received initial transmission or performs a data transmission, the timing or subframe for retransmitting the initial transmission or transmitting the signal for checking the D2D link may include a subframe or time (timing point) corresponding to the window searched by the target user equipment for the corresponding response made by the source user equipment. In particular, since the target user equipment retains the window for searching for a signal for a predetermined time or subframe in order to receive a response signal from the source user equipment after the response to the initial transmission received from the source user equipment or the data transmission from the source user equipment, the source user equipment is able to retransmit the initial transmission to the target user equipment within the corresponding window or transmit the signal for the link check to the target user equipment within the corresponding window. In more particular, a retransmission of an initial transmission or a signal for checking a D2D link can be transmitted in a corresponding subframe or time within a window searched by a counterpart user equipment.

In doing so, if the number of retransmissions of the initial transmission or the number of transmissions of the signal for checking the D2D link exceeds a predetermined count, the source user equipment is able to transmit a signal for checking a resource allocation, a D2D request completion status and/or the like to a base station. In particular, the source user equipment can transmit a signal for checking whether a resource allocation information understood by the source user equipment is correct and/or whether a D2D request procedure is correctly completed [e.g., whether a D2D communication requesting user equipment and a D2D communication accepting user equipment are correct, etc.] to the base station.

2) A target user equipment sets up a search window after elapse of a predetermined time or subframe from an allocation of a resource in response to a D2D request and is then able to scan an initial transmission transmitted from a source user equipment. For instance, the target user equipment is able to scan a signal received for 4 ms (or 4 subframes) by starting with 2 ms (or 2 subframes) from the resource allocation. For another instance, the target user equipment is able to scan a signal received for 4 ms (or 4 subframes) by starting with 3 ms (or 3 subframes) from the resource allocation.

If the target user equipment is unable to receive the signal (or initial transmission) transmitted from the source user equipment in the above-determined window, the target user equipment can transmit a signal for checking a D2D link to the source user equipment.

Assuming that the source user equipment receives the resource allocation after the D2D request and then performs the initial transmission, the timing or subframe for the target user equipment to transmit the signal for the D2D link may include a subframe or time (timing point) corresponding to the window searched by the source user equipment for the corresponding response or data transmission of the target user equipment. In particular, since the source user equipment retains the window for searching for a signal for a predetermined time or subframe in order to receive a response or data transmission from the target user equipment after the initial transmission to the target user equipment, the target user equipment is able to transmit the signal for the D2D link check to the source user equipment within the corresponding window. In more particular, a signal for a D2D link check can be transmitted in a corresponding subframe or time within a window searched by a counterpart user equipment.

In doing so, if the number of transmissions of the signal for checking the D2D link exceeds a predetermined count, the target user equipment is able to transmit a signal for checking a resource allocation, a D2D request completion status and/or the like to a base station. In particular, the target user equipment can transmit a signal for checking whether a resource allocation information understood by the target user equipment is correct and/or whether a D2D request procedure is correctly completed [e.g., whether a D2D communication requesting user equipment and a D2D communication accepting user equipment are correct, etc.] to the base station.

3.4. Resource Allocation for D2D Synchronization

Since a D2D communication differs from a cellular network in transmission delay, it may be very difficult to match subframe synchronization between D2D links and subframe synchronization between a D2D link and an uplink of the cellular network. Hence, when a base station allocates a resource (e.g., subframe) for the D2D communication, it can operate as follows.

First of all, in case that a subframe is allocated for the D2D communication to prepare for a mismatch between the synchronization of the cellular network and the synchronization of the D2D communication, 1 subframe is further allocated in addition to subframes used (or required) for the D2D communication or a guard time amounting to a time interval of 1 subframe can be set. For instance, when the D2D communication uses 2 consecutive subframes, the base station can allocate 3 consecutive subframes in order to prevent collision due to a delay if the D2D communication uses 2 consecutive subframes. In this case, the subframe (or guard time) additionally allocated to the subframes used (or required) for the D2D communication may include an adjacent subframe previous or next to the subframe used (or required) for the D2D communication.

Moreover, in case that subframes are allocated to the D2D communication to prepare for the mismatch between the synchronization of the cellular network and the synchronization of the D2D communication, additional subframe(s) or guard time(s) can be set to include all subframes used (or required) for the D2D communication. In particular, an adjacent subframe previous to the subframe used (or required) for the D2D communication and an adjacent subframe next to the subframe used (or required) for the D2D communication can be additionally allocated.

4. The General of Device for Implementing the Present Invention

Figure 11:
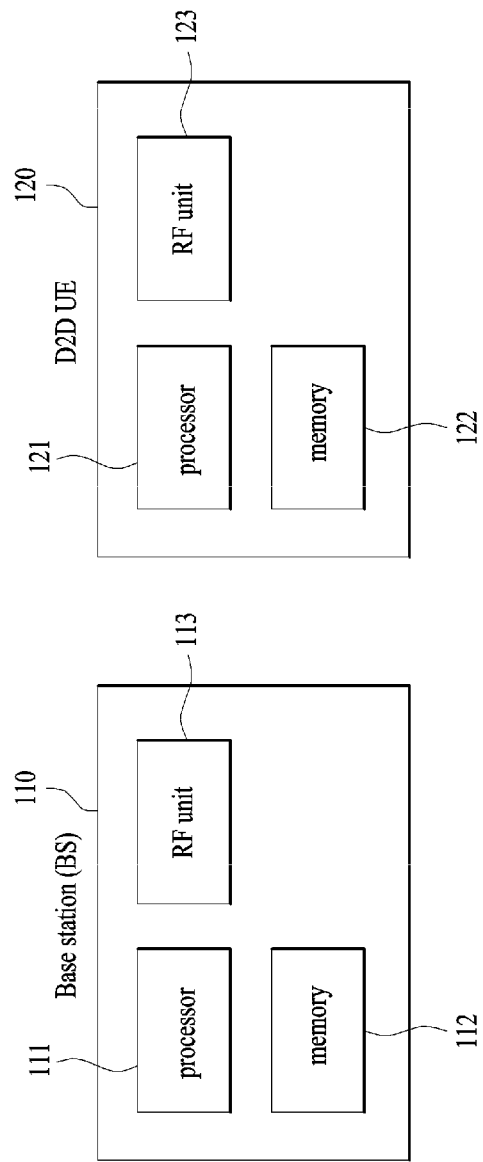
FIG. 11 is a block diagram for a configuration of a wireless communication device according to one embodiment of the present invention.

FIG. 11 is a block diagram for a configuration of a wireless communication device according to one embodiment of the present invention.

Referring to FIG. 11, a wireless communication system may include a base station (BS) 110 and a plurality of D2D user equipments 120 located within an area of the base station 110. In this case, the D2D user equipment may correspond to the aforementioned source or target user equipment.

The base station 110 may include a processor 111, a memory 112 and an RF (radio frequency) unit 113. The processor 111 implements the proposed functions, processes and/or methods. Layers of a radio interface protocol can be implemented by the processor 111. The memory 112 is connected with the processor 111 and then stores various kinds of information to drive the processor 111. The RF unit 113 is connected with the processor 111 and then transmits and/or receives radio signals.

The D2D user equipment 120 includes a processor 121, a memory 122 and an RF unit 123. The processor 121 implements the proposed functions, processes and/or methods. Layers of a radio interface protocol can be implemented by the processor 121. The memory 122 is connected with the processor 121 and then stores various kinds of information to drive the processor 121. The RF unit 123 is connected with the processor 121 and then transmits and/or receives radio signals.

The memory 112/122 may be provided inside or outside the processor 111/121. And, the memory 112/122 may be connected with the processor 111/121 via various kinds of well-known means. Moreover, the base station 110 and/or the D2D user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a data transceiving method in a wireless access system according to the present invention is described with reference to examples applied to 3GPP LTE system, it may be applicable to various kinds of wireless access systems as well as the 3GPP LTE system.

What is claimed is:

1. A method of performing a D2D (device-to-device) communication in a wireless access system supportive of the D2D communication, comprising the steps of:
   receiving by a first user equipment a resource allocation information for the D2D communication with a second user equipment from a base station;
   transmitting by the first user equipment an initial signal for the D2D communication to the second user equipment through the allocated resource;
   scanning by the first user equipment a response signal transmitted from the second user equipment; and
   if the first user equipment receives the response signal from the second user equipment, performing the D2D communication with the second user equipment,
   wherein the initial signal comprises a first reference signal for matching synchronization between the first user equipment and the second user equipment and a second reference signal for a channel estimation between the first user equipment and the second user equipment.

2. The method of claim 1, further comprising the step of if the response signal is not received for a preset time after transmitting the first reference signal and the second reference signal, retransmitting the initial signal to the second user equipment or transmitting a signal for checking a D2D communication link with the second user equipment to the second user equipment.

3. The method of claim 2, further comprising the step of if the number of retransmissions of the initial signal or the number of transmissions of the signal for checking the link exceeds a preset count, transmitting a signal for checking whether the resource allocation and the D2D communication request are completed to the base station.

4. The method of claim 1, wherein the initial signal includes an interference information on measuring interference caused by adjacent user equipments of the first user equipment.

5. The method of claim 4, wherein a preset fixed MCS (modulation and coding scheme) value or a preset fixed modulation order is used for a transmission of the interference information.

6. The method of claim 1, wherein the first reference signal and the second reference signal are identical to each other.

7. The method of claim 1, wherein one of the first reference signal and the second reference signal comprises a DMRS (demodulation reference signal).

8. A method of performing a D2D (device-to-device) communication in a wireless access system supportive of the D2D communication, comprising the steps of:
   receiving by a first user equipment a resource allocation information for the D2D communication with a second user equipment from a base station;
   scanning by the first user equipment an initial signal for the D2D communication transmitted from the second user equipment through the allocated resource; and
   if the first user equipment receives the initial signal from the second user equipment, transmitting a response signal to the second user equipment,
   wherein the initial signal comprises a first reference signal for matching synchronization between the first user equipment and the second user equipment and a second reference signal for a channel estimation between the first user equipment and the second user equipment.

9. The method of claim 8, further comprising the step of if the initial signal is not received for a preset time after receiving the resource allocation information, transmitting a signal for checking whether the resource allocation and the D2D communication request are completed to the base station.

10. The method of claim 8, wherein the initial signal includes an interference information on measuring interference caused by adjacent user equipments of the first user equipment.

11. The method of claim 10, wherein a preset fixed MCS (modulation and coding scheme) value or a preset fixed modulation order is used for a transmission of the interference information.

12. The method of claim 8, wherein the first reference signal and the second reference signal are identical to each other.

13. The method of claim 8, wherein one of the first reference signal and the second reference signal comprises a DMRS (demodulation reference signal).

14. A user equipment, which performs a D2D (device-to-device) communication in a wireless access system supportive of the D2D communication, comprising:
   a RF (radio frequency) unit configured to transceive radio signals; and
   a processor receiving a resource allocation information for the D2D communication with a second user equipment from a base station, the processor transmitting an initial signal for the D2D communication to the second user equipment through the allocated resource, the processor scanning a response signal transmitted from the second user equipment, the processor, if receiving the response signal from the second user equipment, performing the D2D communication with the second user equipment, wherein the initial signal comprises a first reference signal for matching synchronization between the user equipment and the second user equipment and a second reference signal for a channel estimation between the user equipment and the second user equipment.

15. A user equipment, which performs a D2D (device-to-device) communication in a wireless access system supportive of the D2D communication, comprising:
a RF (radio frequency) unit configured to transceive radio signals; and
a processor receiving a resource allocation information for the D2D communication with a second user equipment from a base station, the processor scanning an initial signal for the D2D communication transmitted from the second user equipment through the allocated resource, the processor, if receiving the initial signal from the second user equipment, transmitting a response signal to the second user equipment,
wherein the initial signal comprises a first reference signal for matching synchronization between the user equipment and the second user equipment and a second reference signal for a channel estimation between the user equipment and the second user equipment.

\* \* \* \* \*